United States Patent [19]

Larish

[11] Patent Number: 4,738,526

[45] Date of Patent: Apr. 19, 1988

[54] AUTO-PORTRAIT PHOTO STUDIO

[75] Inventor: John J. Larish, Fairport, N.Y.

[73] Assignee: AutoStudio Corporation, Fairport, N.Y.

[21] Appl. No.: 933,170

[22] Filed: Nov. 21, 1986

[51] Int. Cl.⁴ .......................... G03B 7/00; G03B 15/06
[52] U.S. Cl. ..................................... 354/412; 354/290; 354/76
[58] Field of Search ................... 354/75, 76, 290, 291, 354/412; 358/906, 909

[56] References Cited

U.S. PATENT DOCUMENTS

| | | | |
|---|---|---|---|
| 3,546,378 | 12/1970 | Karikawa | 354/75 |
| 4,130,834 | 12/1978 | Mender et al. | 358/906 |
| 4,183,644 | 6/1980 | Tureck et al. | 354/291 |
| 4,303,322 | 12/1981 | Someya | 354/432 |
| 4,368,966 | 1/1983 | Hagyuda | 354/131 |
| 4,420,773 | 12/1983 | Toyoda et al. | 358/906 |
| 4,618,239 | 10/1986 | Sakamoto | 354/477 |

Primary Examiner—L. T. Hix
Assistant Examiner—David M. Gray
Attorney, Agent, or Firm—Philip D. Junkins

[57] ABSTRACT

A method and system (including a unique arrangement of computer and photographic apparatus) for automated or computer-aided portrait photography. The method and system utilize an automatic, between-the-lens 35 mm camera including auto-wind, auto-focus and auto-exposure features. A beam splitter behind the camera lens captures a part of the image-forming light reflected from the portrait subject to provide a video pickup charge coupled device with an exact color video image of the subject as seen by the camera. On the outside of the camera housing a flat screen video viewfinder is provided which permits the operator (portrait photographer) to view the image which is being received by the video pickup device. The camera and overall system components are interfaced with and connected to a microprocessor and are controlled by the flash circuitry of the camera. When the operator is satisfied with the subject's appearance and pose (as seen through the video viewfinder), press-button action trips the camera shutter for exposure of a frame of film, actuates the flash circuitry of the camera firing flash lighting apparatus and directs (through the microprocessor) the electronic storage (via solid state memory) of a video image identical to the image captured by the camera film. The stored video image can be outputed to a video portrait viewer (CRT screen) for subject viewing. The portrait viewer can also be utilized to display a mutiplicity of the capture (stored) video images (each representing a film frame) for subject selection.

20 Claims, 2 Drawing Sheets

AUTO-PORTRAIT PHOTO STUDIO

BACKGROUND OF THE INVENTION

Portrait photography, to a significant extent, has depended upon the imagination of the photographer. A creative portrait photographer selects and captures qualities in and features of his or her subject that make the picture artistic rather than common place. Classically, the photographer positions the portrait subject in a multitude of poses and takes one or more proof negative photographs of each pose. Proof prints of each photo are then prepared and submitted to the subject for consideration. In a follow-up visit between the photographer and the portrait subject the proof prints are reviewed and selection is made with respect to one or more of the photos. Finally, the portrait subject receives finished prints and/or enlargements of the selected photo or photos. The entire portrait photography process is time consuming for both the photographer and the subject and, if a first set of proof prints do not yield an acceptable photo, the process of photography and preparation of proof prints must be repeated.

It is an object of the present invention to provide an improved system for accomplishing high quality portrait photography over a relatively short time period including a single photographer-subject photography session with final photo selection by the portrait subject.

It is a further object of the invention to provide an improved automated system for accomplishing high quality portrait photography during a single photographer-subject session including in-session selection of one or more photos by the portrait subject for finishing as photo prints and/or enlargements.

It is a still further object of the invention to provide an improved automated system for high quality portrait photography which permits subject photographing, photo pose selection and final print and/or enlargement within a period of approximately one hour.

It is yet another object of the invention to provide a unique method for accomplishing high quality portrait photography during a one-hour session in a photography studio including subject multiple frame photographing, photo pose comparison and selection and final print and/or enlargement production and delivery.

Other objects and advantages of the invention will be apparent from the following summary and detailed description of the invention, taken with the accompanying drawing.

SUMMARY OF THE INVENTION

The present invention relates to a method and system (including a unique arrangement of computer and photographic apparatus) for automated or computer-aided portrait photography. The method and system utilize a fully automatic, between-the-lens 35 mm automatic camera including latest auto-wind, auto-focus and auto-exposure features. A beam splitter behind the camera lens captures a part of the image-forming light reflected from the portrait subject to provide a video pickup charge coupled device (CCD) with an exact color video image of the subject as seen by the camera. On the outside of the camera housing a flat screen video viewfinder is provided which permits the operator (portrait photographer) to view the image which is being received by the video pickup device. The camera and overall system components are interfaced with and connected to a microprocessor and are controlled by the flash circuitry of the camera. When the operator is satisfied with the subject's appearance and pose (as seen through the video viewfinder), press-button action trips the camera shutter for exposure of a frame of film, actuates the flash circuitry of the camera firing flash lighting apparatus and directs (through the microprocessor) the electronic storage (via solid state memory) of a video image identical to the image captured by the camera film.

In accordance with the unique system of the invention, the stored video image can be outputed (by wireless transmission means) to a video portrait viewer (CRT screen) for subject viewing. The video portrait viewer can also be utilized as a means for displaying to the portrait subjects (particularly children) attention-getting images (static or live) of animals, toys, etc. during the pose preparation periods of portrait photographic sessions. In addition, the portrait viewer (via microprocessor direction) can be utilized to display a multiplicity of the captured (stored) video images (each representing a film frame) for subject comparison and selection. Thus, immediately following the taking of a number of portrait photographs, the entire group of stored video images can be displayed in sub-groups (2, 4, 6, etc. images), manipulated for side-by-side comparison and reduced in preference for final selection. The overall auto-portrait system of the invention may also include a color portrait printer (microprocessor directed) for the production of frame printouts as an aid in the photo proofing and selection process with the portrait subject.

The microprocessor is used to check out and direct all functions of the system including film loading, film advance, flash actuation, auto-focus, and image alignment and selection. With regard to the video portrait viewer and the one or more electronic flash units of the system, the microprocessor directs the wireless transmission of video image information to the viewer and flash actuation and timing information to the flash units.

The camera module also includes a slide projection unit for projecting appropriate background images and/or scenery against a high gain reflection screen positioned as a backdrop behind the portrait subject. In operation, the background images or scenery are projected onto the reflective front-coated surface of a beam splitter located within the camera in front of the camera lens and are thereby front projected to the reflection screen. Image-forming light reflected from the portrait subject and background light reflected from the screen enter the camera through its front opening, pass through the front beam splitter to and through the camera lens, and thereafter pass in part through the behind-the-lens beam splitter to the camera shutter and in part are reflected to the video pickup CCD device. The front projector includes means for bar code reading of slide identification and computer verification information that the slide used for background projection purposes is appropriate in accordance with desired photographic affects, as-well-as, a slide positioner so that the slide is correctly oriented.

The system and methodolgy of the present invention combines the latest automatic 35 mm camera technology and microprocessor image information reception, manipulation, storage and regeneration technology for high quality automated or computer-aided, one-session, portrait photography, proofing and product delivery.

Development of the portrait film and printing of selected photographic prints and enlargements is carried out via well known high speed (one-hour or less) developing/printing apparatus and systems. The system also permits automated order processing and billing with printouts, as-well-as film frame and video frame image identification means.

BRIEF DESCRIPTION OF THE DRAWINGS

The foregoing and other objects, features and advantages of the invention will become apparent hereinafter from the following detailed description of the invention taken in conjunction with the accompanying drawings wherein.

DETAILED DESCRIPTION OF THE INVENTION

Figure 1:
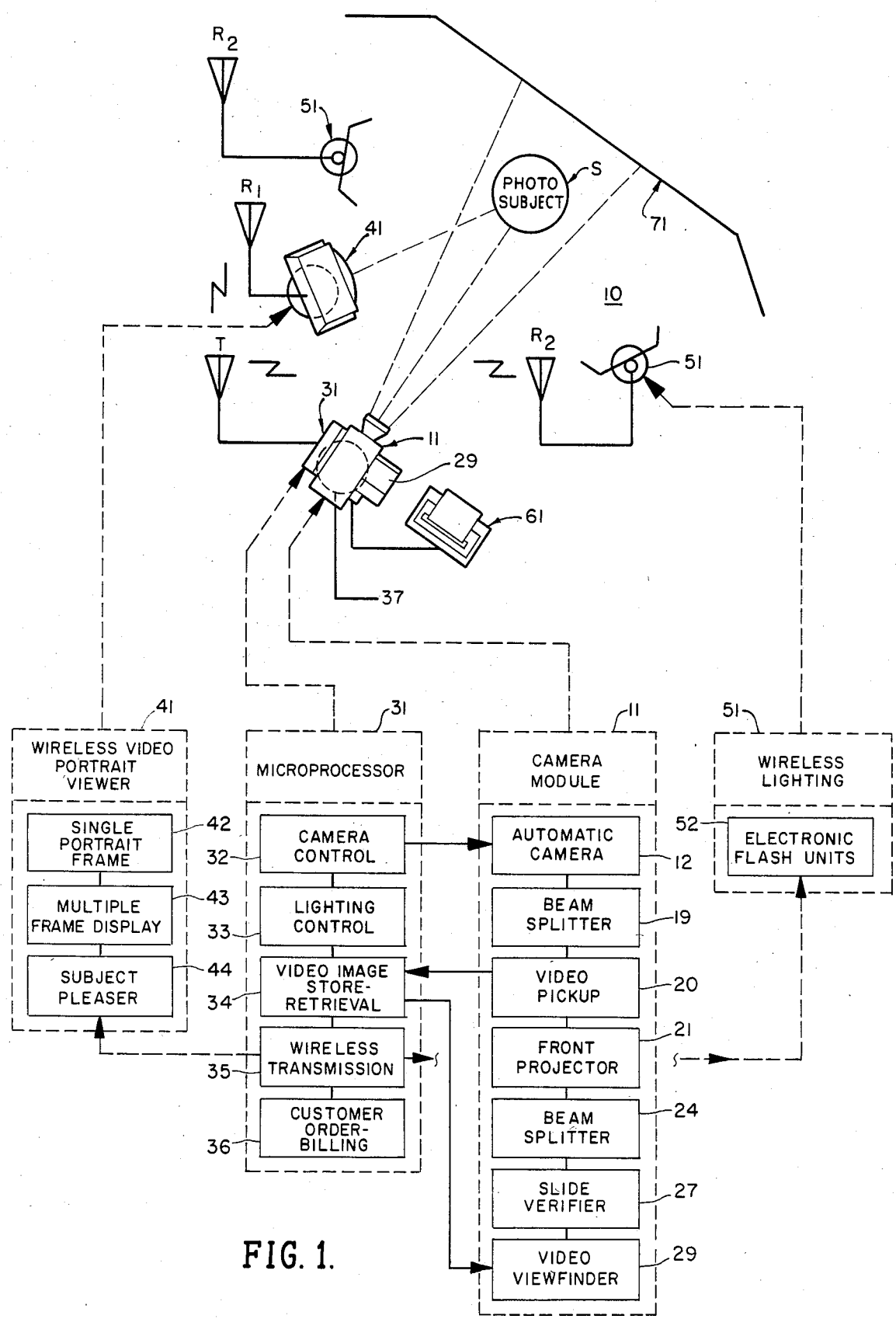
FIG. 1 comprises a top view of the layout of equipment utilized and interacting to accomplish automated portrait photography as a system in accordance with the invention together with block diagramatic presentation of the relationships of internal equipment components and functions of the principal items of equipment of the system.

Referring now to the drawings, a preferred embodiment of the invention is illustrated in FIG. 1 and includes a layout of equipment utilized and interacting for automated portrai photography as a system together with a block diagramatic showing of the relationships of the principal equipment modules and their components and functions. Numeral 10 represents in general an auto-portrait studio according to the invention. The studio consists of basic equipment components including: camera module 11, microprocessor 31, wireless video portrait viewer 41, wireless lighting units 51, a computer-directed printer 61 and a high reflection backdrop screen 71. These equipment components, as situated in FIG. 1, are centered about a portrait subject S located in front of reflection screen 71 facing the camera module 11 and in viewing alignment with the video portrait viewer 41. As shown in FIG. 1, the microprocessor 31 is positioned below the camera module 11.

Figure 2:
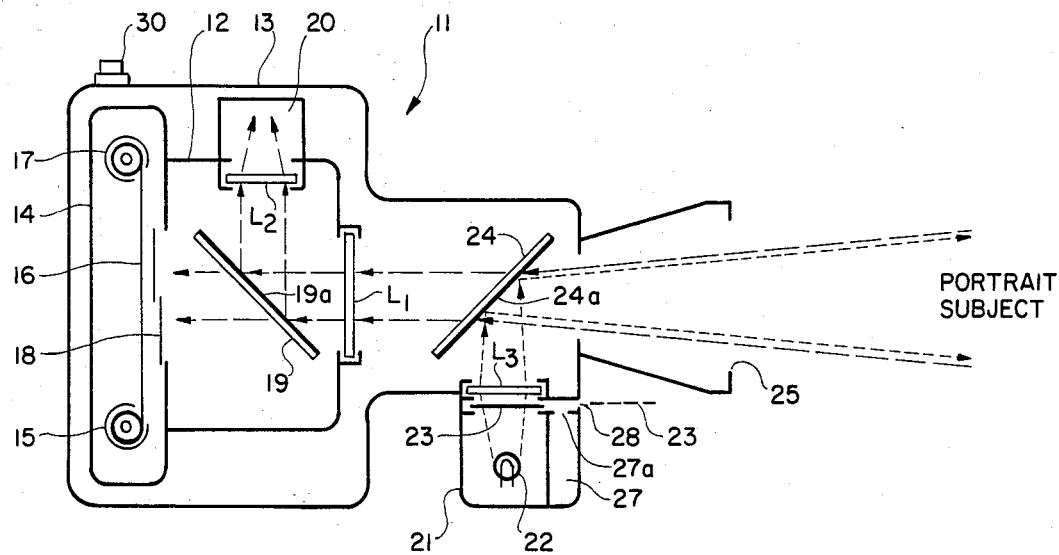
FIG. 2 is a side sectional schematic representation of the camera module utilized in the automated, computer-aided portrait photographic system of the invention.

The camera module 11 is shown in the side sectional schematic representation of the module in FIG. 2. The camera 12, located within camera module housing 13, is an automatic 35 mm long length camera including latest auto-wind, auto-focus and auto-exposure features. The camera also includes as basic components: film compartment 14 including a bulk film delivery cartridge 15, film 16 and a film take-up cartridge 17; shutter mechanism 18; and front camera lens $L_1$. Built into the camera structure (behind the lens $L_1$) is a beam splitter 19 which is essentially a flat glass lens which is silver coated on its front surface 19a. The beam splitter 19 is positioned to receive imageforming light (passing through camera lens $L_1$) and reflect a part of the image-forming light through lens $L_2$ to a video pickup CCD device 20. The principal portion of the image-forming light (passing through lens $L_1$) passes through the beam splitter 19 and (upon the opening of shutter 18) is received by film 16 with the image captured thereon by the film's light-sensitive coating.

The camera module 11 is also specially equipped with a built-in front projector 21 which includes a tungsten focus/electronic exposure flash unit 22 which illuminates a 35 mm slide 23 of background or scenery subject matter. The slide subject matter is projected through projector lens $L_3$ to a beam splitter 24 which is silver coated on its front surface 24a. The beam splitter 24 is positioned to receive the background (scenery) image-forming light and reflect same through the front opening 25 of the camera module 11 for projection to the high reflection backdrop screen 71 situated behind the portrait subject (see FIG. 1). The background image-forming light is reflected back from the screen 71 to the front opening 25 of the camera module 11 and, together with the image-forming light from the portrait subject S, passes: through the beam splitter 241; to and through camera lens $L_1$; and to and through (in part) the behind-the-lens beam splitter 19. As previously indicated, a part of the imageforming light from the portrait subject and a part of the background (scenery) image-forming light is reflected by beam splitter 19 to the video pickup CCD device 20.

Figure 3:
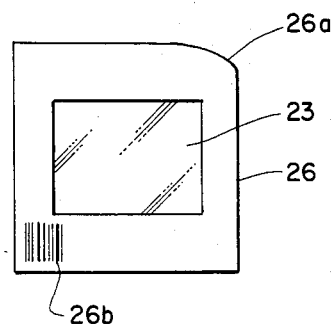
FIG. 3 is a plan view of a background or scenery slide mount designed for use with the front projector of the camera module in accordance with the invention.

The front projector 21 is designed to accept only specially prepared slide mounts for the portrait background (scenery) slides. Thus, each slide mount 26 (FIG. 3) for each slide 23 has a single eccentrially rounded corner 26a and a bar code reader strip 26b. A bar code reading device or slide verifier 27 (with reader port 27a) is associated with the projector 21. With the slide 23 (shown in phanto ) positioned for insertion into the projector 21 through slide slot 28 and with the bar code strip 26b positioned for reading by slide verifier 27 and the rounded corner 26a positioned at the lead-in edge of slide mount 26, it is assured that, when the slide is fully inserted into the projector the background or scenery imagery, to be flash projected onto the reflection screen 71, will be appropriately oriented with respect to the portrait subject.

The camera module 11 (as shown in FIG. 1) has as part of its structure, on the outside of housing 13, a flat screen video viewfinder 29. The video viewfinder 29, under microprocessor control and direction in cooperation with the camera's video pickup CCD device 20 permits the operator (portrait photographer) to see the image of the portrait subject as viewed by the camera 12 prior to the firing of the camera to expose a frame of film. Through the video viewfinder the operator can direct adjustment of the subject's pose position and expression. The camera's internal battery power supply and operating circuitry drive all functions of the camera including the electronic exposure flash unit 22 of the front projector 21. Activation of the camera circuitry functions, along with other functions of the interrelated microprocessor 31, wireless video portrait viewer 41 and wireless lighting system 51, for accomplishing autoportrait photography in accordance with the invention, are initiated by pushbutton 30 of the camera module 11.

The microprocessor 31 of the present auto-protrait system may be of any of the well-known commercially available types. It is used in the system, through its inferface with the camera module 11, to check and control all camera functions 32 including film loading and rewind, film advance, electronic flash, front projector operation and auto-focus. The microprocessor 31 also acts and interacts within the auto-portrait system to provide lighting control 33 and to receive the output of the camera's video pickup CCD device 20. Thus, the portrait subject's image as seen by the video pickup device of the camera is relayed to the video viewfinder 29 of the camera for operator viewing and, upon activation of the camera circuitry (shutter opening and film capture of a portrait photograph on film), the subject's portrait video image is captured by the microprocessor's memory store 34. Upon operator direction (through an infrared keyboard arrangement, not shown) the portrait video image may be retrieved from the microprocessor's memor store and displayed by wireless (or cable) transmission on the CRT screen of the video portrait viewer 41. Display on the viewer 41 may be as a single full-screen portrait image (viewer function 42) or in a multiple display arrangement (viewer function 43) at reduced size along with other portrait images captured during the photographic portrait session for comparison and selection purposes. During multiple display, the several images may be shifted in their display arrangement and reduced in number as the selection process proceeds.

The micro processor 31 also receives for storage, retrieval and display purposes (under keyboard direction), via the portrait viewer 41, single images or video tape live images and programs for gaining the attention of the portrait subjects and for promoting special photographic expressions from children (subject pleaser function 44) during child portrait photography sessions. As previously indicated, the transmission of a single captured video image (function 42), multiple displayed images (function 43) or subject pleaser imagery (function 44) may be by wireless transmission (function 35) under the direction of the operator via the microprocessor. The wireless transmission systems involve the use of a transmitting antenna T associated with the microprocessor and a receiving antenna $R_1$ associated with the video portrait viewer 41. Alternatively, the transmission of imagery may also be conducted by direct cable connection between the microprocessor 31 and the video portrait viewer 41.

Film roll and frame identification data, corresponding video image identification and retrieval information, and customer order processing and billing information (function 36) is also handled by the microprocessor 31 and ordered out or printed out through operator keyboard direction. Thus, video images captured during the photography session can be be printed out for comparison and selection purposes via electronic printer 61 and the order processing and billing information is generated by the same printer at the conclusion of the session.

The auto-portrait system of the invention also includes special subject lighting apparatus 51. The lighting apparatus, as shown in FIC. 1, comprises compact rechargeable flash lighting (function 52), fired by remote control through the wireless transmission of light firing signals under microprocessor direction. The lighting units 51 have built in spill-control louvers which reduce or eliminate background pickup and assure professional lighting with a minimum of lighting expertise on the part of the operator. Although cable connection between the electronic flash devices 52 and the microprocessor is entirely within the realm of the auto-portrait system, wireless control through the mechanism of transmission antenna T and reception antennae $R_2$ at the light stations is preferred so that floor areas between the microprocessor 31 and the lighting units 51 are free of communication cables. The same non-obstruction philosophy applies with respect to communication between the microprocessor and the video portrait viewer 41. As previously indicated, the screen 71, which acts as a backdrop with respect to camera-subject alignment for receiving proJected background and scenery, has a high reflection surface. Although the camera module has its own internal power source via batteries (expendable or rechargeable), the microprocessor 31 is provided with its power via power line 37. Where wireless lighting 51 is provided, the electronic flash units 52 included in such lighting are energized by rechargeable batteries.

In operation of the auto-portrait photo studio of the present invention, the portrait subject is positioned appropriately in alignment with the camera module 11 in front of the reflective background screen 71. Usually the portrait subject will be seated for subject comfort and for ease in promoting appropriate pose orientation and development of a pleasing expression. Through operator (portrait photographer) control the camera module 11 is aligned properly with the portrait subject and determination is made as to the nature of the background scenery to be utilized. Subject alignment of the camera module is accomplished by the operator's viewing of the portrait subject through the video viewfinder 29 associated with the camera module. The subject's attention is held or attracted to the video portrait viewer 41 in accordance with instructions and imagery or programmed video material generated by the microprocessor 31 by operator command and inputted by keyboard operation.

At the time of operator decision as to desired subject pose and expression, the push-button 30 of the camera is depressed whereby the camera circuitry (in cooperation with the microprocessor): (i) actuates the flash projection of background scenery to background screen 71 by the front projector 21 of the camera; (ii) actuates flash lighting of the portrait subject by electronic flash units 52; (iii) opens the shutter 18 of the camera for the admission of image-forming light from the portrait subject to the light-sensitive surface of a film frame within the camera; and (iv) simultaneously records within the microprocessor's memory a video image of the portrait subject as picked up by the video charged coupled device 20 of the camera from the behind-the-lens beam splitter 19. The video image captured by the microprocessor is an exact replica of the photographic image of the portrait subject captured on a frame of the film within the camera. In accordance with the invention, the captured video image can be retrieved from the microprocessor's memory store for manipulation, display and/or printout as required by the operator and in accordance with the portrait subject's desire. Thus, the entire process of portrait photography, including proof review and selection, can be accomplished in a matter of minutes by the system of the present invention. Coupled with the technology and equipment of fast film development and printing (one hour or less), the entire portrait photography process, as automated by the invention, can be accomplished in an extremely short period of time with delivery of high quality prints and enlargements to the portrait subject in less than several hours from the time of commencement of the portrait photography session.

While the invention has been described in connection with particular structural embodiments of an auto-portrait studio and camera module, variances and modifications in the embodiments will be apparent to those skilled in the art. Accordingly, such modifications are to be included within the spirit and scope of the invention as defined by the following claims.

What I claim is:

1. A microprocessor-aided portrait photography system for the exposure of one or more frames of photographic film to the image-forming light reflected from a portrait subject and simultaneous reception and recording to said image-forming light to produce identical video displays of the image of the portrait subject as captured by said film, said portrait photography system comprising:

(a) an automatic camera including a camera housing, multiple frame photographic film, auto-focus lens means, auto-exposure shutter means, auto-film-wind means, and circuitry means for operating said camera;

(b) a video charge coupled device located within the camera housing and out of the path of image-forming light reflected from the portrait subject toward a frame of said photographic film;

(c) beam splitting means within the camera housing between said lens means and said shutter means for diverting a portion of said image-forming light to said charge coupled device for reception and conversion of said diverted portion of said image-forming light to an exact video image of the portrait suject as viewed by said camera;

(d) a microprocessor interconnected to the circuitry means of said camera to control the photographic functions thereof and interconnected to said charge coupled device to receive said video image and at the instant of exposure of said film frame record and store said image in the memory of said microprocessor;

(e) a video viewfinder associated with said camera housing and interconnected with said microprocessor for the display of said video image and for directing the alignment of said camera with the portrait subject;

(f) means associated with the circuitry means for said camera for actuating said shutter means to expose a frame of said film; and (g) a video potrait viewer in communication with said microprocessor and located remote from said camera, within viewing range of the portrait subject, for the display to said subject of an exact video image as recorded and stored by said microprocessor as a representation of the image of the portrait subject captured on a frame of said photographic film.

2. A microprocessor-aided portrait photography system as claimed in claim 1 wherein the video charge coupled device within the camera housing converts said diverted portion of image-forming light to an exact color video image of the portrait subject as viewed by said camera and the video viewfinder associated with said camera and the video portrait viewer display said color video image as a visual representation of the image of the portrait subject captured on the frame of said photographic film by said camera.

3. A microprocessor-aided portrait photography system as claimed in claim 1 wherein flash lighting means is provided in communication with and under the direction said microprocessor for illuminating the portrait subject at the instant of activation of said shutter means and exposure of said film.

4. A microprocessor-aided portrait photography system as claimed in claim 1 wherein means is provided through the microprocessor to display via the video portrait viewer multiple video images of the portrait subject corresponding to the multiple frames of photographs of said subject captured on the camera film for comparison and selection by said subject.

5. A microprocessor-aided portrait photography system as claimed in claim 1 wherein means is provided through the microprocessor to periodically display via the video portrait viewer during a portrait photography session static and live images and programs for entertaining and gaining the attention of the portrait subject.

6. A microprocessor-aided portrait photography system as claimed in claim 1 wherein the camera is provided with a front projector for projecting illustrative matter from a transparency slide to a high reflection screen situated behind the portrait subject to provide background scenery for the portrait photography accomplished by said system.

7. A microprocessor-aided portrait photography system as claimed in claim 6 wherein secondary beam splitting means is provided within the camera housing in front of the auto-focus lens means for reflecting the illustrative matter projected from the front projector of the camera through the front opening of the camera housing to said reflection screen without inhibiting the reception by the camera of image-forming light reflected from the portrait subject.

8. A microprocessor-aided portrait photography system as claimed in claim 6 wherein the front projector of said camera is provided with means in communication with the microprocessor for reading bar code indicia on each transparency slide to verify that the illustrative matter of said slide is compatible as background scenery for the portrait photography.

9. A microprocessor-aided portrait photography system as claimed in claim 6 wherein the front projector of said camera is provided with means for accepting each transparency slide only in its proper projection orientation for projection of background scenery for the portrait photography.

10. A microprocessor-aided portrait photography system as claimed in claim 1 wherein the microprocessor is interconnected with a computer keyboard for controlling said portrait photography system.

11. A microprocessor-aided portrait photography system as claimed in claim 10 wherein portrait subject order-processing and billing information is inputted into said system through said keyboard and printed out via an electronic printer interconnected with said microprocessor.

12. A microprocessor-aided portrait photography system for the exposure of a sequence of photographic film frames to the image-forming light reflected from a portrait subject during a sequence of poses and simultaneous reception and recording of said image-forming light to produce an identical sequcnce or video images of the portrait subject as captured by said film frames, said portrait photography system comprising:

(a) an automatic camera including a camera housing, multiple frame photographic film, auto-focus lens means, auto-exposure shutter means, auto-film-wind means, and circuitry means for operating said camera;

(b) a video charge coupled device located within the camera housng and out of the path of image-forming light reflected from the portrait subject toward a frame of said photographic film;

(c) beam splitting means within the camera housing between said lens means and said shutter means for diverting a portion of said image-forming light to said charge coupled device for reception and conversion of said diverted portion of said image-forming light to exact color video images o the portrait subject as viewed by said camera;

(d) a microprocessor interconnected to the circuitry means of said camera to control the photographic functions thereof and interconnected to said charge coupled device to receive the color video images of the portrait subject and at the instant of exposure of each film frame record and store the identical video image in the memory of said microprocessor;

(e) a flat screen video view finder associated with said camera housing and interconnected with said microprocessor for the display of said video images to the camera operator for alignment of said camera with the portrait subject;

(f) means associated with the circuitry means of said camera for a actuating said shutter means to expose each frame of said film; and (g) a CRT video portrait viewer in communication with said microprocessor and located remote from said camera, within viewing range of the portrait subject, for display to the portrait subject of said video images as recorded and stored by said microprocessor as identical representation of the images of the portrait subject captured on each film frame.

13. A microprocessor-aided portrait photography system as claimed in claim 12 wherein flash lighting means, external of the camera housng, is provided in communication with and under the direction of said microprocessor for illuminating the portrait subject at the instant of activation of said shutter means and exposure of said film.

14. A microprocessor-aided portrait photography system as claimed in claim 12 wherein means is provided through the microprocessor to display via the video portrait viewer multiple video images of the portrait subject corresponding to the multiple frames of photographs of said subject captured on the camera film for comparison and selection by said subject.

15. A microprocessor-aided portrait photography system as claimed in claim 12 wherein the camera is provided with a front projector for projecting illustrative matter from a transparency slide to a high reflection screen situated behind the portrait subject to provide background scenery for the portrait photography accomplished by said system.

16. A microprocessor-aided portrait photography system as claimed in claim 15 wherein secondary beam splitting means is provided within the camera housing in front of the auto-focus lens means for reflecting the illustrative matter projected from the front projector of the camera through the front opening of the camera housing to said reflection screen without inhibiting the reception by the camer of image-forming light reflected from the portrait subject.

17. A microprocessor-aided portrait photography system as claimed in claim 12 wherein said beam splitting means consists essentially of a flat glass lens which bears a silver coating on its forward surface and is oriented at an angle with respect to the image-forming light reflected from the portrait subject to divert a portion of said light to said video charge coupled device.

18. A microprocessor-aided portrait photography system as claimed in claim 16 said secondary beam splitting means consists essentially of a flat glass lens which bears a silver coating on its forward surface for reflecting the illustrative matter projected from the front projector of said camera to said reflection screen behind the portrait subject.

19. A method of microprocessor-aided, automated portrait photography of a portrait subject comprising the steps of:

(a) receiving image-forming light reflected from a portrait subject through the lens of an auto-focus, auto-exposure and auto-film-wind camera:

(b) directing said image-forming light within said camera to a beam splitting means behind the lens of said camera for passage of a first portion of said image-forming light therethrough to the shutter of said camera and for reflection of a second portion of said image-forming light to a video charge coupled device for the conversion thereof to a video image of the portrait subject as viewed by said camera;

(c) displaying said video image through microprocessor means on a flat screen video viewfinder associated with said camera for assisting the camera operator in the alignment of said camera with the portrait subject;

(d) opening the shutter of said camera to permit the passage of said first portion of said image-forming light to expose a frame of light sensitive film for the recording of a photogaphic image of the portrait subject thereon and at the same instant directing the reception and recording of the video image of the video charge coupled device in the memory circuitry and disc storage software of said microprocessor means: and (e) retrieving said video image from said memory circuitry and said software of said microprocessor means and displaying said video image on a CRT video portrait viewer to the portrait subject for review by said subject as an exact representation of the photographic image recorded on said frame of film.

20. A method of microprocessor-aided, automated portrait photography of a portrait subject as claimed in claim 19 wherein the opening of the shutter of said camera energizes circuitry directing the microprocessor means to coordinate and activate the energization of flash lighting means for illuminating the portrait subject.

* * * * *